Nov. 17, 1964  L. A. MOE ETAL  3,157,154
SPIN BALL PRESSURE INTERRUPTER
Filed Nov. 13, 1962
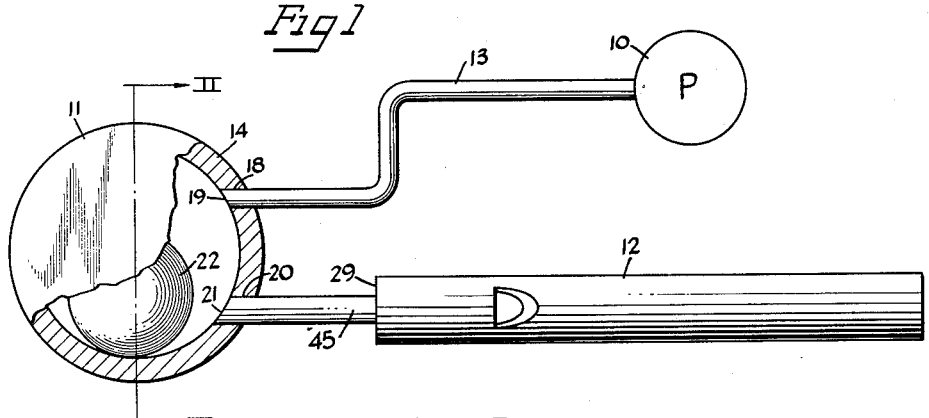
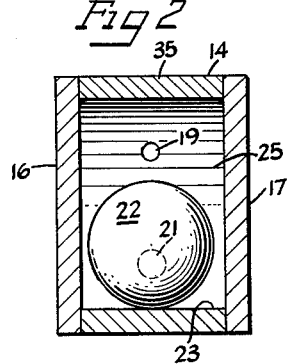
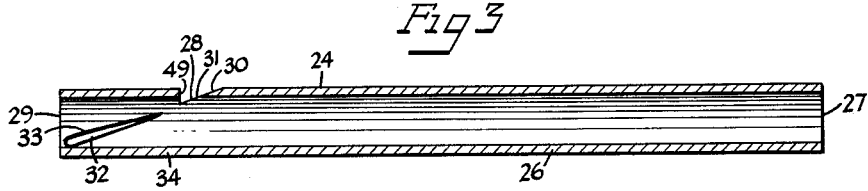
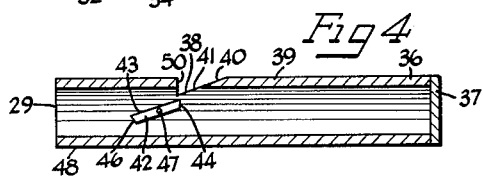
INVENTORS
Richard Warren
BY Lowell A. Moe
ATTORNEYS

United States Patent Office 3,157,154
Patented Nov. 17, 1964

3,157,154
SPIN BALL PRESSURE INTERRUPTER
Lowell A. Moe, St. Paul, and Richard E. Warren, Minneapolis, Minn., assignors to F. H. Peavey and Company, Minneapolis, Minn., a corporation of Minnesota
Filed Nov. 13, 1962, Ser. No. 236,859
8 Claims. (Cl. 116—137)

This invention relates generally to fluid pressure interrupter devices and more particularly to a spin ball type pressure interrupter for use in ultrasonic sound wave generating systems. The interrupter of the present invention is simple in design, inexpensive in manufacture, dependable in operation and has a long useful life.

It has been well established through experimentation that animals having small brain cavities or craniums are adversely effected by high frequency sound waves which are beyond the audible frequency spectrum of human beings. For example, the upper limit of the normal audio hearing spectrum for humans is approximately 15,000 cycles per second. Sound waves having frequencies beyond this range cannot be heard by humans, nor do these sound waves have any effect on the nervous system of humans. However, sound waves having ultrasonic frequencies, that is, frequencies beyond approximately 15,000 cycles per second can be heard by and have a definite adverse effect upon small animals.

There appears to be a direct relation between the size of the cranium or brain cavity of an animal and the adverse audio hearing spectrum of that animal. For example, an average sized rat will be adversely effected by an ultrasonic sound wave having a frequency of approximately 20,000 cycles per second. Hearing an ultrasonic sound wave at this high frequency level will cause the rat to do almost anything to escape the unbearable sound, and will on occasion even destroy himself to end the suffering. A field mouse, having a smaller brain cavity, will withstand frequencies up to about 21,000 cycles per second before he, too, can no longer bear the sound. It appears that a cockroach or centipede, having still a smaller brain cavity, is not adversely effected until frequencies reaching 27,000 to 28,000 cycles per second are attained. Through theoretical projection, it appears that a mosquito, having an extremely small brain cavity, will not be effected at frequencies less than 37,000 cycles per second.

Tests also demonstrate that these small animals will develop an ability to endure high level frequencies if subjected to them over a period of time. For example, if an average sized rat is subjected to an ultrasonic sound wave of 20,000 cycles per second it will attempt to escape from the scope of the sound. However, if it cannot escape, after a period of time the sound will have less effect on the rat until finally the rat will develop a deafness immunity to the sound wave. It will lose its immunity if the sound wave is stopped for a period of time, and will have to redevelop it again upon resumption of generation of the sound wave.

It has further been determined that an animal must be subjected to a sound wave of a nearly constant frequency in order to develop deafness immunity. This immunity does not extend to ultrasonic sound waves at different frequencies. Further, if the sound wave has a constantly varying frequency rather than a constant frequency the animal will not be able to develop this deafness immunity. The use of ultrasonic sound waves to control the activity of undesirable animals in certain locations has been studied in the past. For example, sound waves have been used in an attempt to control the problem of rodent infestation in food storage areas, such as grain elevators. The sound waves are used to move the rodents from the storage area to remote feeding stations, where conventional means of extermination are used.

Conventional practice is to create the ultrasonic sound waves electronically. This method imposes serious limitations in the use of sound waves for this purpose. The electronic equipment necessary is expensive, is relatively sensitive and has an inherently relatively short life span. Also, its use is generally prohibited in many hazardous areas, such as the explosion latent atmosphere of a grain elevator or mill.

The present invention relates to the generation of ultrasonic sound waves by means of pressurized fluid-operated resonators. The invention also contemplates the generation of these waves in such a manner as to provide a constantly varying frequency so as to prevent animals from developing a deafness immunity to the sound waves.

The present invention also contemplates the use of an ultrasonic sound wave generator comprising a resonator particularly adapted to produce high frequency sound waves.

In producing sound waves by means of a tubular resonator in the audible hearing spectrum of human beings, that is, below 15,000 cycles per second, it is not necessary to use a high pressure fluid in actuating the resonator. The length of the wave, and consequently the frequency of the wave, is determined by the length of the cavity of the resonator. However, in producing ultrasonic sound waves with a tubular resonator, an actuating fluid having a higher pressure must be used and the frequency produced is determined not only by the length of the cavity of the resonator, but also by the pressure of the actuating fluid. If, therefore, in producing ultrasonic sound waves by means of a tubular resonator the frequency of the wave can be varied by varying the pressure of the actuating fluid, the varying fluid pressure will also prevent deafness immunity from developing in small animals within the scope of the sound waves. As previously mentioned, a sound wave of varying frequency will preclude deafness immunity.

It is, therefore, a principal object of the present invention to provide a means to vary the pressure of the actuating fluid in an ultrasonic sound wave generating system using a resonator.

Another object of the present invention is to provide a fluid pressure varying device incorporating only one moving part.

Another object of the present invention is to provide a fluid pressure interrupter which requires only the pressure of the fluid as a source of energy to function.

Another object of the present invention is to provide a fluid pressure interrupter which is completely self-contained and requires no external source of control.

Yet another object of the present invention is to provide a fluid pressure interrupter having a spinning ball as its only moving part and which is simple in design, inexpensive in manufacture, dependable in operation and has a long useful life.

Another object of the present invention is to provide a method of producing an ultrasonic sound wave having a variable frequency by means of a generating system using a spin ball pressure interrupter.

These and other objects, features and advantages of the present invention will be apparent from the following detailed description taken in conjunction with the accompanying figures of the drawing.

On the drawings:
FIGURE 1 is a top view of an ultrasonic sound wave generating system and including a partially sectional view of a spin ball pressure interrupter of the present invention.

FIGURE 2 is an elevational sectional view of the spin ball pressure interrupter of the present invention taken substantially along lines II—II of FIGURE 1;

FIGURE 3 is an elevational sectional view of an open-cavity tubular resonator suitable for use in the embodiment of FIGURE 1; and FIGURE 4 is an elevational sectional view of a closed-cavity tubular resonator suitable for use in the embodiment of FIGURE 1.

As shown on the drawings:

An ultrasonic sound wave generating system is shown generally in FIGURE 1 and includes a source of pressurized fluid 10, a spin ball pressure interrupter 11 and a tubular resonator 12.

The pressurized fluid source 10 can comprise a centrifugal or positive displacement gas or liquid pump or compressor or the like, and is connected to a pressure interrupter 11 by a pipe 13 or the like.

In the preferred form of the invention as illustrated in FIGURES 1 and 2, the pressure interrupter 11 has a housing 35 forming a chamber 25 and comprises a cylindrical side wall 14 and a pair of flat, spaced, parallel end walls 16 and 17. An intake passageway 18 is formed within the side wall 14 and is spaced upwardly from the elevational center line of the interrupter, terminating in an inlet port 19. An end portion of the connecting pipe 13 is shown inserted into the passageway 18 such that the inlet port 19 of the interrupter 11 is in communication with the pump 10. An outlet passageway 20 is also formed within the side wall 14 and is spaced downwardly from the elevational center line of the interrupter and terminates in an outlet port 21.

Housed loosely within the interrupter is a spherically shaped ball 22 having a diameter which slightly less than the distance between the two end walls 16 and 17 and slightly greater than half the diameter of the side wall 14. The top of the ball 22, therefore, as the ball rests on a bottom surface 23 of the side wall 14 extends slightly above the elevational center line of the interrupter, as is illustrated in FIGURE 2. The ball 22 can be made of solid or hollow material and the weight of the ball is commensurate with the density of the actuating fluid being pumped. As the density of the fluid being pumped is increased, the weight of the material comprising the ball is increased.

One end of a pipe or the like 45 is inserted into the outlet passageway 20 and the other end is connected to an inlet port 29 of the resonator such that the interrupter 11 is in communication with the resonator 12.

The resonator of FIGURE 1 may comprise a tubular resonator of the open-cavity or closed-cavity type.

FIGURE 3 illustrates an embodiment of an open-cavity type resonator adapted for use with a pressurized fluid to produce sound waves in the ultrasonic frequency range, that is, beyond 15,000 cycles per second. The open-cavity resonator of FIGURE 3 includes a housing 24 having a side wall 26 with an opening at each end comprising an inlet port 29 and an outlet port 27. Spaced proximately from the inlet port 29 is an aperture 28 formed in an upper portion of the housing 24. An oblique wall 30, which partially defines the aperture 28 also defines a cleavage point or lip 31. In order to prevent collapse of oscillations in the actuating fluid, which is under sufficient pressure to produce ultrasonic frequencies, means are provided to direct the stream of fluid entering from the inlet port across the cleavage point in a direction substantially coplanar to the oblique wall 30. A baffle 32 having a substantially flat surface 33 is positioned within the housing 24 and fixedly connected to a lower portion 34 of the housing. The baffle is arranged at an angle to the direction of the incoming actuating fluid stream thereby directing the fluid across the cleavage point 31 of the aperture 28. Thus, collapse of oscillations of the fluid within the resonator is prevented, and the generation of ultrasonic sound waves is sustained.

FIGURE 4 illustrates another embodiment of the resonator of FIGURE 1 and comprises a closed-cavity resonator adapted for use with a pressurized actuating fluid to produce ultrasonic sound waves and includes a housing 36 having an open end 29 and a closed end 37. Proximately spaced from the open end or inlet port 29 is an aperture 38 formed in an upper portion 39 of the housing 36. An oblique wall 40, which partially defines the aperture 38 also defines a cleavage point or lip 41. Similarly to the open-cavity resonator of FIGURE 3, a baffle 42 is provided in the closed-cavity resonator of FIGURE 4 to direct the incoming pressurized fluid stream across the cleavage point 41, thereby preventing collapse of the oscillations of the fluid within the resonator at ultrasonic frequencies. The baffle 42 is positioned within the housing 36 intermediate the inlet port 29 and the aperture 38 and has a flat surface 43 and a front and rear edge 44 and 46 respectively. The baffle is adjustable and for this purpose is pivotally mounted on a shaft 47 which is journalled at opposite sides of the housing 36. The adjustment of the baffle is limited to prevent abutment of its edges 44 and 46 and the housing 36. When pressurized actuating fluid enters the resonator through the inlet port 29 the baffle 42 directs most of the fluid stream across the cleavage point 41. As oscillations of the fluid are produced at the cleavage point, a portion of the fluid, in an oscillated state, moves within the housing 36 to the closed end 37 where the waves are deflected backwardly in the direction of the baffle 42. Since the rear edge 46 is in spaced relation to a lower portion 48 of the housing 36, the deflected waves pass between the rear edge of the baffle and the lower portion of the housing where they are admixed with the incoming fluid to once again be directed to the cleavage point. Collapse of oscillations of the pressurized fluid is thereby prevented and an ultrasonic sound wave is sustained.

The resonators of the type illustrated in FIGURES 3 and 4 are particularly advantageous in combination with the illustrated pressure interrupter in that they respond to the changes in pressure produced thereby to generate interruptions and frequency variations in the ultrasonic waves to greatly increase the effectiveness of the system. The frequency of operation of each resonator is determined by the length of the cavity of the resonator and the pressure of the actuating fluid. The cavity length of a resonator is that distance between a vertical wall 49 and the outlet port 27 of an open-cavity type illustrated in FIGURE 3, and the distance between a vertical wall 50 and the closed end 37 of a closed-cavity type illustrated in FIGURE 4.

As illustrated in FIGURE 1, a pump 10 discharges pressurized fluid through the pipe 13 to the inlet port 19 of the spin ball pressure interrupter 11. This pressurized fluid will travel to that portion of the side wall 14 opposite the inlet port 19 and thereafter move downwardly along the side wall in the direction of the outlet port 21. The force of the fluid moving thusly within the interrupter 11 will cause the ball 22 to travel in a counter-clockwise direction substantially along the inner periphery of the side wall 14. During each rotation of the ball 22 it will momentarily restrict the flow of the fluid through the outlet port 21, thereby momentarily reducing the pressure of the fluid as it enters the inlet port 29 of the resonator 12. This momentary reduction in the pressure of the fluid will cause a variation or fluctuation in the frequency of the ultrasonic sound waves being produced by the resonator 12.

As previously stated, a small animal being subjected to an ultrasonic sound wave within the range which causes an irritating effect on its nervous system will not develop a deafness immunity to the sound wave if the frequency of the sound wave is modulated.

The spin ball pressure interrupter of the present invention, therefore provides a means for varying the pressure to an ultrasonic sound wave generator of the resonator type, and is simple in design, inexpensive in manufacture, dependable in operation and has a long useful life.

Although various minor modifications of the present invention might be apparent to those skilled in the art, it is to be understood that we wish to embody within the scope of the patent warranted hereon all such embodiments as reasonably and properly come within the scope of our contribution to the art.

We claim as our invention:

1. A system for producing ultrasonic sound waves having a constantly varying frequency comprising, in combination, a source of pressurized fluid, a fluid operated tubular resonator, said resonator adapted to produce ultrasonic sound waves having a frequency varying with the pressure of the operating fluid, a fluid pressure interrupter, said interrupter comprising a substantially cylindrical side wall and a pair of end walls forming a chamber, said side wall having an inlet port and an outlet port formed therein and opening into said chamber, a substantially spherical fluid actuated ball carried within said chamber and rotatable therein to pass over said outlet port, and connecting means to connect said source and said inlet port and said outlet port and said resonator, whereby said fluid traveling from said source through said interrupter will rotate said ball over said outlet port thereby reducing the pressure of said fluid at said resonator.

2. A system for producing ultrasonic sound waves of constantly varying frequency comprising, in combination, a source of pressurized fluid, a fluid operated resonator, said resonator having a longitudinal body portion and adapted to produce ultrasonic sound waves having a frequency varying with the pressure of the operating fluid, a fluid pressure interrupter, said interrupter comprising a substantially cylindrical side wall and a pair of end walls forming a chamber, said side wall having a plurality of spaced passageways formed therein and opening into said chamber, a fluid actuated member carried within said chamber and freely movable therein to pass over said openings of said passageways, and means to connect said source and one of said passageways and a second of said passageways and said resonator, whereby said fluid traveling from said source through said interrupter will move said member over said opening of said passageways thereby restricting the flow of fluid to said resonator.

3. A system for producing ultrasonic sound waves having a varying frequency to repel animals having a small brain cavity comprising, in combination, a source of pressurized fluid, a fluid operated tubular resonator adapted to produce ultrasonic sound waves having a frequency varying with the pressure of said operating fluid, said resonator comprising a hollow housing having an inlet port and an aperture formed in said housing, a baffle positioned within and fixedly connected to said housing for directing fluid entering said inlet port to said aperture, a fluid pressure interrupter having a substantially cylindrical side wall and a pair of end walls and forming a chamber, said side wall forming a pair of spaced, parallel passageways extending through said side wall and opening into said chamber, a substantially spherical ball carried within said chamber and being freely movable to rotate within said chamber and to pass over said passageways when acted upon by the flow of said fluid, and means to connect said source and one of said passageways and the other of said passageways and said inlet port of said resonator to convey said fluid from said source through said interrupter to said resonator, whereby the fluid passing through said interrupter will rotate said ball within said chamber to periodically move said ball over said passageways to restrict said passageways and thereby reduce the fluid pressure at said resonator and thereby vary the frequency of the sound waves produced by said resonator.

4. In a system for repelling animals having a small brain cavity having a source of constant pressure fluid and a fluid operated ultrasonic sound wave generating resonator adapted to produce varying frequencies responsive to changes in the pressure of the operating fluid and a means to connect the source and the resonator, the improvement for varying the pressure of the fluid at the resonator, said improvement comprising a housing inserted into said connecting means intermediate said source and said resonator, said housing having a side wall and a pair of end walls and forming a chamber, said side wall having a pair of passageways formed therein and extending therethrough into said chamber, one of said passageways communicating said chamber and said means connected to said source and the other passageway communicating said chamber and said resonator, and a spherical ball carried within said chamber and freely movable to rotate within said chamber when acted upon by the flow of said fluid to periodically restrict said passageways and thereby reduce the pressure of said fluid at said resonator, whereby the varying pressure of said fluid at said resonator will vary the frequency of the sound waves being produced by said resonator.

5. In a system for repelling animals having a small brain cavity having a source of constant pressure fluid and a fluid operated ultrasonic sound wave generating resonator of the tubular cavity type having a baffle positioned therein for directing fluid to a cleavage point and adapted to produce varying frequencies responsive to changes in the pressure of the operating fluid and a means to connect the source and the resonator, the improvement for varying the pressure of the fluid at the resonator, said improvement comprising a housing inserted into said connecting means intermediate said source and said resonator, said housing having a cylindrical side wall and a pair of end walls and forming a cylindrical chamber, said side wall having a pair of spaced, parallel passageways formed therein and extending therethrough into said chamber, one of said passageways communicating said chamber and said means connected to said source and the other passageway communicating said chamber and said resonator, and a spherical ball carried within said chamber and freely movable to rotate within said chamber when acted upon by the flow of said fluid to periodically restrict said passageways and thereby reduce the pressure of said fluid at said resonator, whereby the varying pressure of said fluid at said resonator will vary the frequency of the sound waves being produced by said resonator.

6. A spin ball pressure interrupter for use in a system of repelling animals having a small brain cavity, said system having a source of pressurized fluid and a fluid operated resonator adapted to produce ultrasonic sound waves at a frequency varying with the pressure of said operating fluid and means connecting said source and said resonator comprising a housing inserted in said connecting means intermediate said source and said resonator,
        said housing comprising a side wall and a pair of end walls and forming a chamber,
        said side wall forming a passageway extending therethrough and opening into said chamber and connected to said connecting means to communicate said chamber and said source,
        said side wall forming a second passageway extending therethrough and opening into said chamber and connected to said connecting means to communicate said chamber and said resonator,
    a curve member carried within said chamber and freely movable to rotate within said chamber and pass over said openings of said passageways when acted upon by the flow of said fluid, whereby said passageways will be periodically momentarily restricted thereby causing momentary reduction in fluid pressure at said resonator and varying the frequency of the sound wave being produced by said resonator.

7. A spin ball pressure interrupter for use in a system of repelling animals having a small brain cavity, said system having a source of pressurized fluid and a fluid operated resonator adapted to produce ultrasonic sound waves at a frequency varying with the pressure of said operating fluid and means connecting said source and said resonator comprising a housing inserted in said connecting means intermediate said source and said resonator,
        said housing comprising a cylindrical side wall and a pair of flat end walls and forming a cylindrical chamber,
        said side wall forming a passageway extending therethrough and opening into said chamber above the center line of said chamber and connected to said connecting means to communicate said chamber and said source,
        said side wall forming a second passageway being located in spaced, parallel relation to said first passageway and extending through said side wall and opening into said chamber below the center line of said chamber and connected to said connecting means to communicate said chamber and said resonator,
    a spherical ball carried within said chamber and freely movable to rotate within said chamber and pass over said openings of said passageways when acted upon by the flow of said fluid, whereby said passageways will be periodically momentarily restricted by said ball thereby causing momentary reduction in fluid pressure at said resonator and varying the frequency of the sound waves being produced by said resonator and thereby preventing deafness immunity of the animals.

8. A system for producing ultrasonic sound waves of constantly varying frequency comprising, in combination, a source of pressurized fluid,
    a fluid operated resonator,
        said resonator adapted to produce ultrasonic sound waves having a frequency varying with the pressure of the operating fluid,
    a fluid pressure interrupter having a substantially cylindrical side wall and a pair of end walls and forming a chamber,
    an inlet port and an outlet port formed in said interrupter,
        said inlet port being formed in said side wall,
    a substantially spherical ball carried within said chamber and being freely movable to rotate within said chamber and to pass over at least one of said ports when acted upon by the flow of said fluid, and means for connecting in fluid communication said source to said inlet port of said interrupter and said outlet port of said interrupter to said resonator.

References Cited in the file of this patent
UNITED STATES PATENTS

| | | |
|---|---|---|
| 992,487 | Ellison | May 16, 1911 |
| 1,059,447 | Evelyn | Apr. 22, 1913 |
| 1,773,965 | Dollison | Aug. 26, 1930 |
| 1,826,129 | Gronquist | Oct. 6, 1931 |
| 2,664,850 | Smith | Jan. 5, 1954 |
| 2,675,777 | Lachaise | Apr. 20, 1954 |
| 2,798,452 | Baer | July 9, 1957 |
| 2,971,491 | Yeagley | Feb. 14, 1961 |

FOREIGN PATENTS

| | | |
|---|---|---|
| 429,624 | France | July 22, 1911 |